United States Patent
Iga

(10) Patent No.: US 9,352,995 B2
(45) Date of Patent: May 31, 2016

(54) PLATE GLASS PRODUCTION DEVICE, AND PLATE GLASS PRODUCTION METHOD

(71) Applicant: Asahi Glass Company, Limited, Chiyoda-ku, Tokyo (JP)

(72) Inventor: Motoichi Iga, Tokyo (JP)

(73) Assignee: ASAHI GLASS COMPANY, LIMITED, Tokyo (JP)

( * ) Notice: Subject to any disclaimer, the term of this patent is extended or adjusted under 35 U.S.C. 154(b) by 0 days.

(21) Appl. No.: 14/453,476

(22) Filed: Aug. 6, 2014

(65) Prior Publication Data

US 2014/0345327 A1 Nov. 27, 2014

Related U.S. Application Data

(63) Continuation of application No. PCT/JP2013/050956, filed on Jan. 18, 2013.

(30) Foreign Application Priority Data

Feb. 8, 2012 (JP) .................................. 2012-024751

(51) Int. Cl.
| | |
|---|---|
| C03B 35/16 | (2006.01) |
| C03B 18/02 | (2006.01) |
| C03C 3/091 | (2006.01) |
| C03B 18/06 | (2006.01) |
| C03B 18/14 | (2006.01) |
| C03B 18/20 | (2006.01) |
| C03B 18/22 | (2006.01) |
| C03B 35/18 | (2006.01) |
| C03C 3/093 | (2006.01) |

(52) U.S. Cl.
CPC .................. *C03B 35/16* (2013.01); *C03B 18/02* (2013.01); *C03B 18/06* (2013.01); *C03B 18/14* (2013.01); *C03B 18/20* (2013.01); *C03B 18/22* (2013.01); *C03B 35/181* (2013.01); *C03C 3/091* (2013.01); *C03C 3/093* (2013.01); *C03B 2225/02* (2013.01)

(58) Field of Classification Search
CPC .................... C03B 18/00–18/22-35/16-35/189; C03B 2225/02
See application file for complete search history.

(56) References Cited

U.S. PATENT DOCUMENTS 3,218,141 A * 11/1965 Lambert ............... C03B 17/061
65/182.3
2009/0270242 A1 10/2009 Yanase et al.
2010/0223956 A1 9/2010 Moon et al.

FOREIGN PATENT DOCUMENTS

| JP | H10-324526 A | 12/1998 |
|---|---|---|
| JP | 2001-146433 A | 5/2001 |
| JP | 2009-013049 A | 1/2009 |
| JP | 2010-202507 A | 9/2010 |
| WO | WO-2009/014028 A1 | 1/2009 |

OTHER PUBLICATIONS

International Search Report dated Apr. 16, 2013 issued in Application No. PCT/JP2013/050956.

* cited by examiner

*Primary Examiner* — Erin Snelting
(74) *Attorney, Agent, or Firm* — Foley & Lardner LLP

(57) ABSTRACT

Provided is an apparatus for producing a sheet glass, including: a forming device that forms a glass ribbon by allowing molten glass continuously supplied onto molten metal in a bath to flow on the molten metal; a rotary roll disposed in an outer vicinity of the bath and configured to draw the glass ribbon obliquely upward from the molten metal; and a supporting device supporting the rotary roll from below.

8 Claims, 7 Drawing Sheets

PLATE GLASS PRODUCTION DEVICE, AND PLATE GLASS PRODUCTION METHOD

CROSS-REFERENCE TO RELATED APPLICATIONS

This application is a continuation application filed under 35 U.S.C. 111(a) claiming the benefit under 35 U.S.C. §§120 and 365(c) of PCT International Application No. PCT/JP2013/050956 filed on Jan. 18, 2013, which is based upon and claims the benefit of priority of Japanese Application No. 2012-024751 filed on Feb. 8, 2012, the entire contents of which are hereby incorporated by reference in their entireties.

TECHNICAL FIELD

The present invention relates to an apparatus for producing a sheet glass and a method for producing a sheet glass.

BACKGROUND ART

An apparatus for producing a sheet glass, comprises a forming device that forms a glass ribbon by allowing molten glass continuously supplied onto molten metal (e.g., molten tin) in a bath to flow onto the molten metal and a rotary roll disposed in an outer vicinity of the bath and configured to draw the glass ribbon obliquely upward from the molten metal (e.g., see Patent Document 1).

The glass ribbon formed on the molten metal is drawn obliquely upward from the molten metal so as not to rub against the side wall at the downstream side of the bath and is carried forward to an annealing furnace via the upper part of the rotary roll. The glass ribbon annealed in the annealing furnace is cut into a predetermined sized shape by means of a cutting device to obtain a sheet glass that is a manufactured article. The sheet glass may be polished.

BACKGROUND ART DOCUMENT

Patent Document

Patent Document 1: JP-A-2010-202507

SUMMARY OF THE INVENTION

Problems that the Invention is to Solve

Hitherto, a distance between a drawing-up position of a glass ribbon from molten metal and a supporting position of the glass ribbon with a rotary roll is long and a difference in height between the drawing-up position and the supporting position is large so that the glass ribbon rubs against the side wall at the downstream side of the bath. Therefore, it has been difficult to lift the leading edge portion of the glass ribbon with a pole or the like so as to place the glass ribbon onto the rotary roll.

The present invention is accomplished in view of the above-mentioned problem and an object of the invention is to provide an apparatus for producing a sheet glass and a method for producing a sheet glass in which it is easy to place the leading edge portion of the glass ribbon onto the rotary roll.

Means for Solving the Problems

In order to solve the above-described problem, an object of the present invention is to provide an apparatus for producing a sheet glass comprising:

a forming device that forms a glass ribbon by allowing molten glass continuously supplied onto molten metal in a bath to flow on the molten metal;

a rotary roll disposed in an outer vicinity of the bath and configured to draw the glass ribbon obliquely upward from the molten metal; and a supporting device supporting the rotary roll from below.

In the apparatus for producing a sheet glass of the present invention, it is preferred that the supporting device comprises an auxiliary bath for storing a liquid for floating the rotary roll.

It is preferred that the supporting device further comprises a liquid amount controlling unit that controls an amount of the liquid in the auxiliary bath.

It is preferred that a guide groove that guides the rotary roll in a vertical direction and also limits movement of the rotary roll in a horizontal direction is provided on a side wall of the auxiliary bath.

It is preferred that the liquid is molten metal.

It is preferred that an atmosphere above the molten metal in the auxiliary bath is a reducing atmosphere.

In the apparatus for producing a sheet glass of the present invention, it is preferred that the supporting device comprises a support roll that supports the rotary roll from below.

It is preferred that the supporting device further comprises a roll lifting unit that lifts up and down the support roll and the rotary roll with respect to the bath.

In the apparatus for producing a sheet glass of the present invention, it is preferred that the rotary roll is formed from carbon, silicon carbide, or silica.

Moreover, an another object of the present invention is to provide a method for producing a sheet glass comprising:

a step of forming a glass ribbon by allowing molten glass continuously supplied onto molten metal in a bath to flow on the molten metal;

a step of drawing the glass ribbon obliquely upward from the molten metal by using a rotary roll disposed in an outer vicinity of the bath; and a step of placing a leading edge portion of the glass ribbon onto the rotary roll, wherein the rotary roll is supported from below.

In the method for producing a sheet glass of the present invention, it is preferred that the rotary roll is floated on a liquid in an auxiliary bath provided adjacent to the bath and is supported with the liquid.

It is preferred that the method for producing a sheet glass further comprises a step of reducing an amount of the liquid in the auxiliary bath to lower the rotary roll with respect to the bath before a leading edge portion of the glass ribbon is placed onto the rotary roll.

It is preferred that the method for producing a sheet glass further comprises a step of increasing the amount of the liquid in the auxiliary bath to elevate the rotary roll with respect to the bath after the leading edge portion of the glass ribbon is placed onto the rotary roll.

It is preferred that the liquid is molten metal.

In the method for producing a sheet glass of the present invention, it is preferred that an atmosphere above the molten metal in the auxiliary bath is a reducing atmosphere.

In the method for producing a sheet glass of the present invention, it is preferred that the rotary roll is supported from below with a support roll that comes into contact with an outer circumferential surface of the rotary roll.

It is preferred that the method for producing a sheet glass further comprises a step of lowering the support roll and the rotary roll with respect to the bath before the leading edge portion of the glass ribbon is placed onto the rotary roll.

It is preferred that the method for producing a sheet glass further comprises a step of elevating the support roll and the rotary roll with respect to the bath after the leading edge portion of the glass ribbon is placed onto the rotary roll.

In the method for producing a sheet glass of the present invention, it is preferred that the rotary roll is formed from carbon, silicon carbide, or silica.

In the method for producing a sheet glass of the present invention, it is preferred that the sheet glass is composed of an alkali-free glass containing, as represented by mass percentage on the basis of oxides, $SiO_2$: 50 to 66%; $Al_2O_3$: 10.5 to 24%; $B_2O_3$: 0 to 12%; MgO: 0 to 8%; CaO: 0 to 14.5%; SrO: 0 to 24%; BaO: 0 to 13.5%; and $ZrO_2$: 0 to 5%, wherein MgO+CaO+SrO+BaO is 9 to 29.5%.

It is preferred that the sheet glass is composed of an alkali-free glass containing, as represented by % by mass based on oxides, $SiO_2$: 58 to 66%; $Al_2O_3$: 15 to 22%; $B_2O_3$: 5 to 12%; MgO: 0 to 8%; CaO: 0 to 9%; SrO: 3 to 12.5%; and BaO: 0 to 2%, wherein MgO+CaO+SrO+BaO is 9 to 18%.

Advantage of the Invention

According to the present invention, provided are an apparatus for producing a sheet glass and a method for producing a sheet glass in which it is easy to place a leading edge portion of a glass ribbon onto a rotary roll.

MODE FOR CARRYING OUT THE INVENTION

Hereinafter, embodiments for carrying out the invention will be described with reference to the drawings. In the following drawings, the same or corresponding numerals and signs are attached to the same or corresponding constitutions and the explanations therefor are omitted. Moreover, explanation is conducted such a manner that an upstream side in a conveying direction of the glass ribbon is regarded as an upstream side and a downstream side in a conveying direction of the glass ribbon is regarded as a downstream side.

Figure 1:
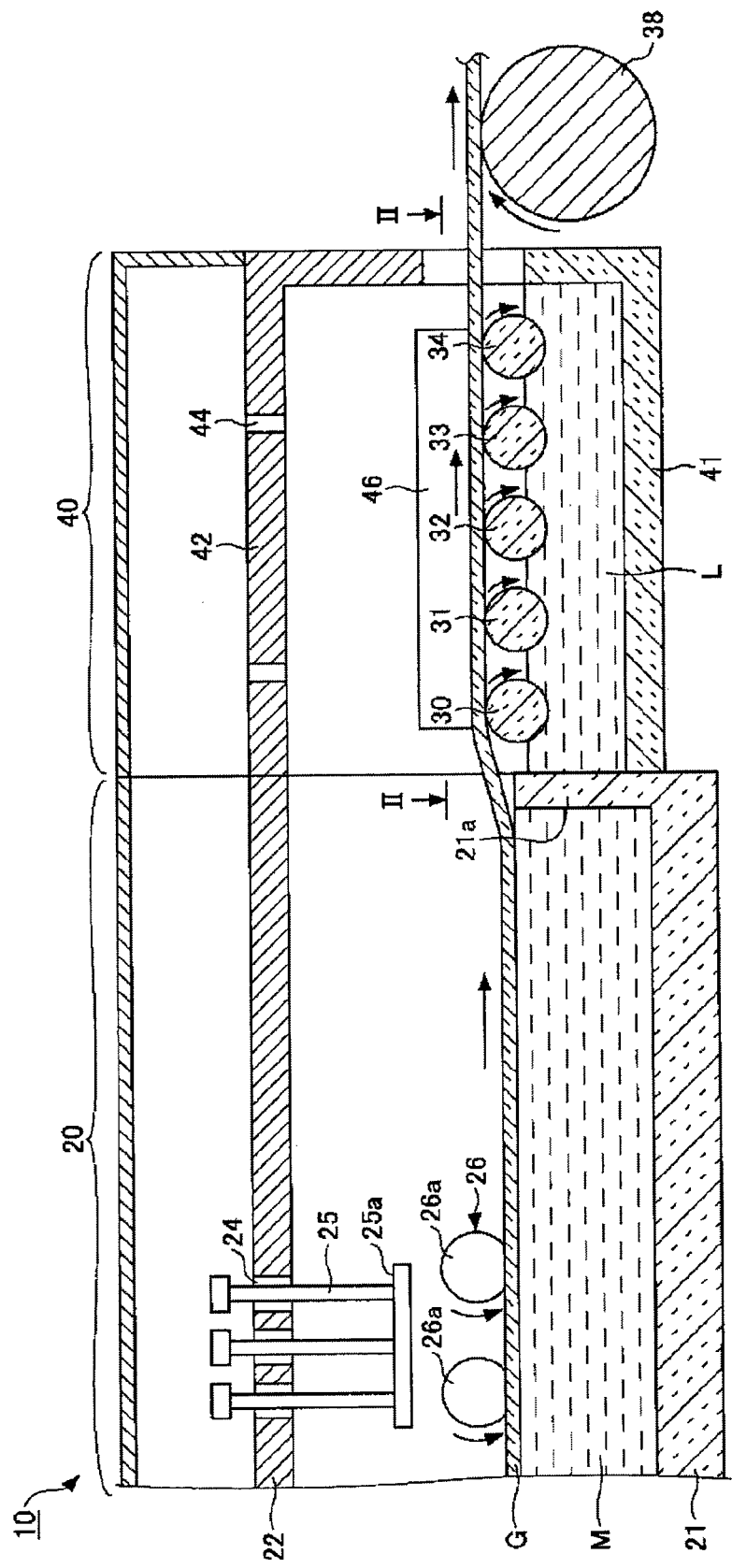
FIG. 1 is a cross-sectional view showing a part of an apparatus for producing a sheet glass according to one embodiment of the invention.
Figure 2:
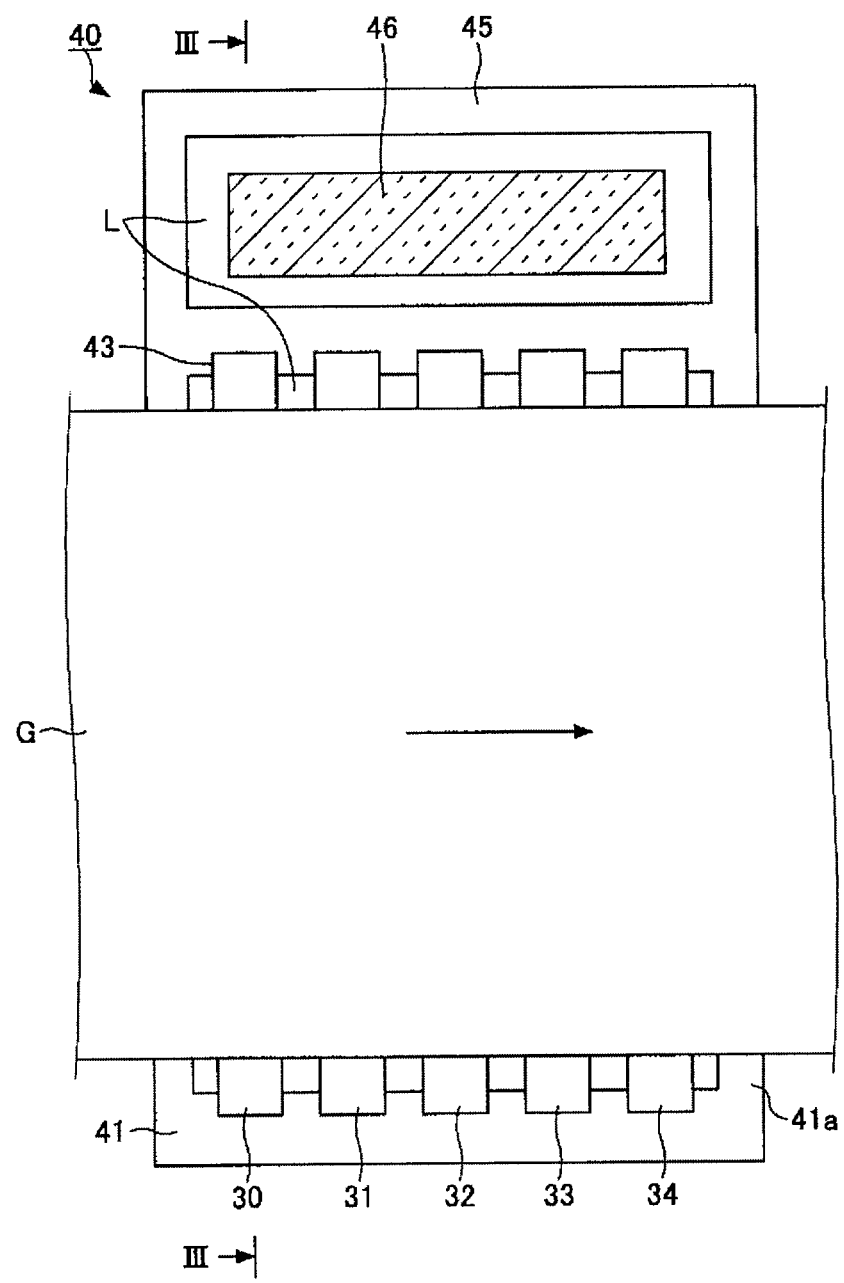
FIG. 2 is a cross-sectional view along the II-II line in FIG. 1.
Figure 3:
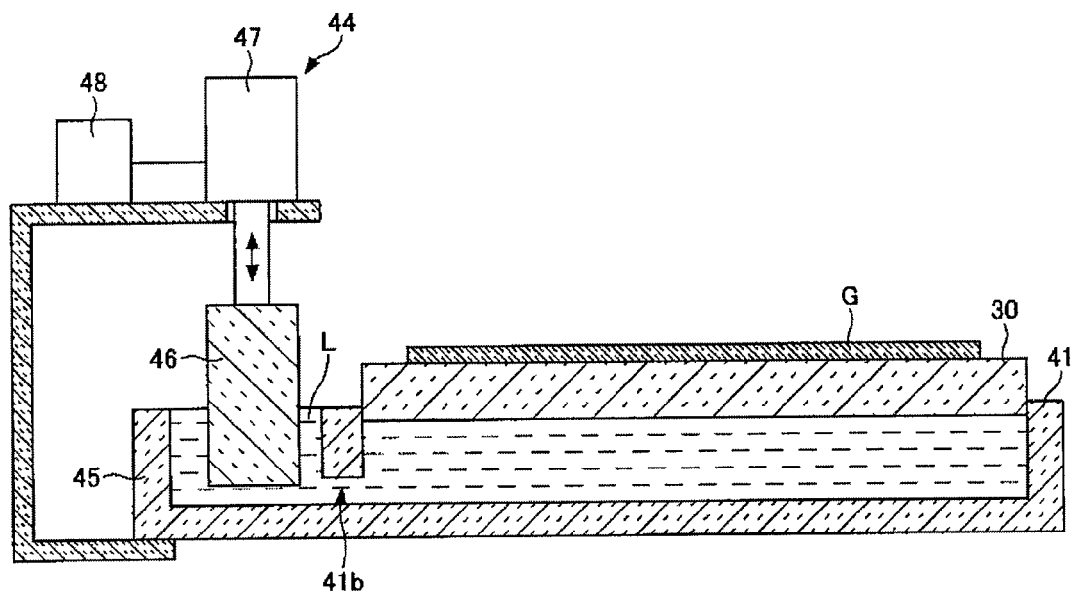
FIG. 3 is a cross-sectional view along the III-III line in FIG. 2.

FIG. 1 is a cross-sectional view showing a part of an apparatus for producing a sheet glass according to one embodiment of the invention. FIG. 2 is a cross-sectional view along the II-II line in FIG. 1. FIG. 3 is a cross-sectional view along the III-III line in FIG. 2.

The apparatus for producing a sheet glass 10, comprises a forming device 20 that forms a glass ribbon G having band plate shape by allowing molten glass continuously supplied onto molten metal (e.g., molten tin) M in a bath 21 to flow on the molten metal M; and a rotary roll 30 disposed in an outer vicinity of the bath 21 and configured to draw the glass ribbon G obliquely upward from the molten metal M. The glass ribbon G formed on the molten metal M is drawn obliquely upward from the molten metal M so as not to rub against the side wall 21a at the downstream side of the bath 21 and is carried forward to an annealing furnace via the upper part of the rotary roll 30. The glass ribbon annealed in the annealing furnace is cut into a predetermined sized shape by means of a cutting device to obtain a sheet glass that is a manufactured article. The sheet glass may be polished.

(Forming Device)

The forming device 20 includes the bath 21 for storing the molten metal M, a ceiling 22 that covers an upper part of the bath 21. A gas supply path 24 that supplies a reducing gas to the space between the ceiling 22 and the bath 21 is provided on the ceiling 22. In addition, a heater 25 is inserted through the gas supply path 24 and a heating unit 25a of the heater 25 is disposed above the bath 21.

The gas supply path 24 supplies a reducing gas to the space between the ceiling 22 and the bath 21 for preventing oxidation of the molten metal M in the bath 21. The reducing gas contains, for example, 1 to 15% by volume of hydrogen gas and 85 to 99% by volume of nitrogen gas. The space between the ceiling 22 and the bath 21 is maintained at a pressure higher than the atmospheric pressure in order to prevent interfusion of atmospheric air from outside.

For example, plural heaters 25 are arranged at intervals in flow direction and width direction of the glass ribbon G. The output of the heaters 25 is controlled such a manner that the temperature of the glass ribbon G becomes higher at an upper stream side of the flow direction of the glass ribbon G. Moreover, the output of the heaters 25 is controlled such a manner that the thickness of the glass ribbon G becomes even in the width direction.

Moreover, in order to suppress shrinkage of the glass ribbon G in the width direction, the forming device 20 has assist roll 26 that supports the glass ribbon G. Plural pairs of the assist rolls 26 are disposed at both sides of the width direction to impart a tension to the glass ribbon G in the width direction.

The assist rolls 26 have rotary members 26a that come into contact with the glass ribbon G, at dip portions thereof. The rotary members 26a support the edge portions of the width direction of the glass ribbon G. By the rotation of the rotary members 26a, the glass ribbon G is conveyed into a predetermined direction.

(Rotary Roll)

The rotary roll 30 is disposed in the outer vicinity of the bath 21 and is configured to draw the glass ribbon G obliquely upward from the molten metal M. The rotary roll 30 is provided in the vicinity of the exit of the forming device 20.

The rotary roll 30 is, for example, formed into a column shape or a cylindrical shape. Since the rotary roll 30 is used at high temperature, it is formed from, for example, a ceramic such as silicon carbide or silica or carbon (including graphite and amorphous carbon). Carbon is preferred since it is highly corrosion-resistant against droplets of the molten metal M, imparts only a little damage to the glass ribbon G, and is light in weight.

The rotary roll 30 may be a roll that comes into contact with a lower surface of the glass ribbon G and rotates as the movement of the glass ribbon G and may not be connected to a motor. In this case, a lift-out roll 38 is provided at a downstream side from the rotary roll 30. The lift-out roll 38 is rotated by a motor and draws up the glass ribbon G from the molten metal M by the rotation force.

Figure 4:
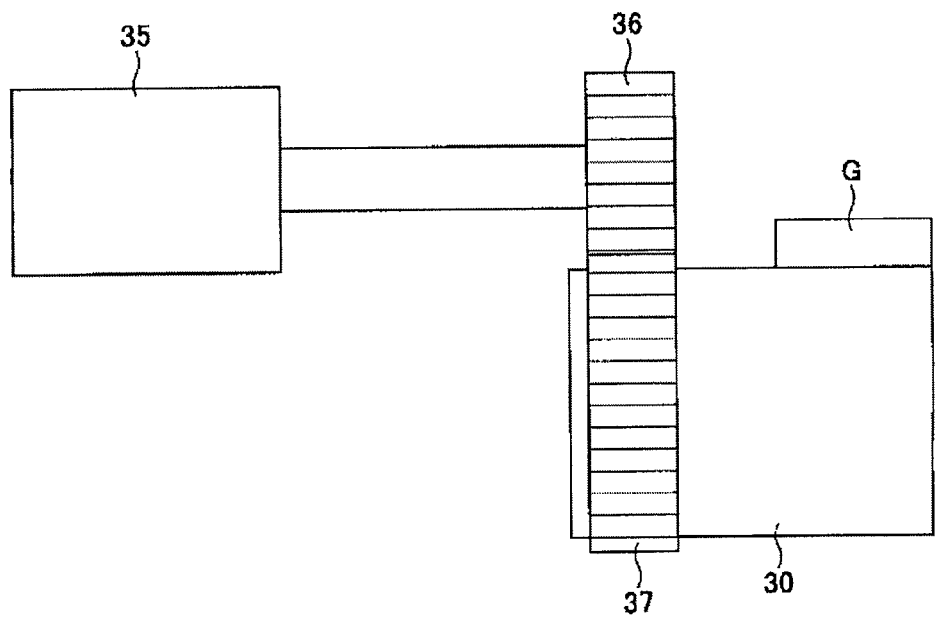
FIG. 4 is a drawing showing a connection mode of a rotary roll and a motor that drives the rotary roll.

Incidentally, it is sufficient that the rotary roll 30 is connected to a motor 35 as shown in FIG. 4. The rotary roll 30 rotates by driving the motor 35 in such a state that a gear 36 that is formed on an output shaft of the motor 35 and a gear 37 which is formed on an edge portion of the rotary roll 30 are engaged. By the rotation force, the glass ribbon G can be drawn up from the molten metal M and be conveyed to a downstream side.

As shown in FIG. 1 and FIG. 2, auxiliary rolls 31 to 34 having a constitution similar to the rotary roll 30 may be provided on a downstream side from the rotary roll 30. The plural auxiliary rolls 31 to 34 are arranged at intervals in the conveying direction of the glass ribbon G. The glass ribbon G may be horizontally conveyed on the plural auxiliary rolls 31 to 34 as shown in FIG. 1 or may be conveyed obliquely upward. In the case where the glass ribbon G is horizontally conveyed, the plural auxiliary rolls 31 to 34 have the same diameter. In the case where the glass ribbon G is conveyed obliquely upward, the plural auxiliary rolls 31 to 34 have diameters which are increasingly larger at more downstream sides.

(Supporting Device)

The supporting device 40 supports the rotary roll 30 from below. Moreover, the supporting device 40 supports the auxiliary rolls 31 to 34 from below. Since the constitution of supporting the rotary roll 30 is the same as the constitution of supporting the auxiliary rolls 31 to 34, the constitution of supporting the rotary roll 30 will be described as a representative.

The supporting device 40 includes, for example, as shown in FIG. 1, an auxiliary bath 41 storing the liquid L that floats the rotary roll 30 and a ceiling 42 that covers above the auxiliary bath 41. The space between the auxiliary bath 41 and the ceiling 42 is communicated with the space of the forming device 20 for preventing the oxidation of the molten metal that is the liquid L, and is preferably filled with a reducing atmosphere. A gas supply path 24 that supplies a reducing gas to the space between the ceiling 42 and the auxiliary bath 41 may be provided on the ceiling 42.

The auxiliary bath 41 is formed into a box shape, for example, from a brick and is provided adjacent to the bath 21. The auxiliary bath 41 may be formed separately from the bath 21 and be fixed to the bath 21 or may be integrally formed with the bath 21.

As the liquid L, a variety of molten metals can be used but, in order to reduce costs, it is preferred to use the same kind of molten metal (e.g., molten tin) as the molten metal M in the bath 21. A rotary roll 30 made of carbon, which is highly corrosion-resistant against the molten metal and has a large difference in density from the molten metal, is suitably used. Since the density of carbon (1.4 to 2.1 g/cm$^3$) is ⅕ to ⅓ of the density of molten tin (6.8 g/cm$^3$), most part of the rotary roll 30 made of carbon is exposed from the liquid L. The glass ribbon G hardly rubs against the side wall of the auxiliary bath 41 storing the liquid L.

The supporting device 40 may further has a liquid amount controlling unit 44 that controls the amount of the liquid L in the auxiliary bath 41, as shown in FIG. 3. When the amount of the liquid L in the auxiliary bath 41 (hereinafter simply referred to as "liquid amount in the auxiliary bath 41") is increased, a liquid level of the auxiliary bath 41 is raised, so that the rotary roll 30 is elevated. On the other hand, when the liquid amount in the auxiliary bath 41 is reduced, the liquid level of the auxiliary bath 41 is decreased, so that the rotary roll 30 is lowered. Similarly to the rotary roll 30, the auxiliary rollers 31 to 34 are also possible to lift up or down depending on the liquid amount in the auxiliary bath 41. On the side wall of the auxiliary bath 41, as shown in FIG. 2, a guide groove 43 that guides the rotary roll 30 in a vertical direction and also limits the movement of the rotary roll 30 in a horizontal direction may be formed. The width of the guide groove 43 is slightly larger than the diameter of the rotary roll 30 and the edge portion of the rotary roll 30 is rotatably inserted in the guide groove 43.

For example, as shown in FIG. 3, the liquid amount controlling unit 44 includes a liquid storage unit 45 that is opened to the liquid L in the auxiliary bath 41, a moving unit 46 that makes the amount of the liquid L in the liquid storage unit 45 variable, and a driving unit 47 that vertically moves the moving unit 46 against the liquid storage unit 45.

The liquid storage unit 45 is formed into a box shape, for example, from a brick and is provided adjacent to the auxiliary bath 41. The liquid storage unit 45 may be integrally formed with the auxiliary bath 41 as shown in FIG. 3 or may be formed separately. The liquid L in the auxiliary bath 41 can freely flow out or in the liquid storage unit 45 through a through hole 41b to be formed at the auxiliary bath 41. The liquid level of the liquid storage unit 45 and the liquid level of the auxiliary bath 41 becomes about the same.

The moving unit 46 is, for example, formed into a block shape and is inserted into the liquid L in the liquid storage unit 45 from above. When the moving unit 46 is lowered against the liquid storage unit 45, the amount of the liquid L in the liquid storage unit 45 (hereinafter simply referred to as "liquid amount in the liquid storage unit 45") is decreased and the liquid amount in the auxiliary bath 41 is increased, so that the liquid level of the auxiliary bath 41 is raised. On the other hand, when the moving unit 46 is elevated against the liquid storage unit 45, the liquid amount in the liquid storage unit 45" is increased and the liquid amount in the auxiliary bath 41 is decreased, so that the liquid level of the auxiliary bath 41 is lowered.

As the driving unit 47, there is used a hydrostatic pressure cylinder such as a hydraulic cylinder or a pneumatic cylinder, a linear motor, a combination of a rotary motor and a ball-screw mechanism that converts the rotation force of the rotary motor into a linear movement, or the like. The lifting of the moving unit 46 by the driving unit 47 may be controlled by a controller 48 containing CPU, memories, and the like.

(Method for Producing Sheet Glass)

The method for producing a sheet glass comprises a step of allowing molten glass continuously supplied onto molten metal (e.g., molten tin) M in a bath 21 to flow on the molten metal M and forming the molten glass into a glass ribbon G and a step of drawing the glass ribbon G obliquely upward from the molten metal M using a rotary roll 30, as shown in FIG. 1.

The glass ribbon G formed on the molten metal M is drawn obliquely upward from the molten metal M so as not to rub against the side wall 21a at the downstream side of the bath 21 and is carried forward to an annealing furnace via the upper part of the rotary roll 30. The glass ribbon annealed in the annealing furnace is cut into a predetermined sized shape by means of a cutting device to obtain a sheet glass that is a manufactured article. The sheet glass may be polished.

Figure 5A:
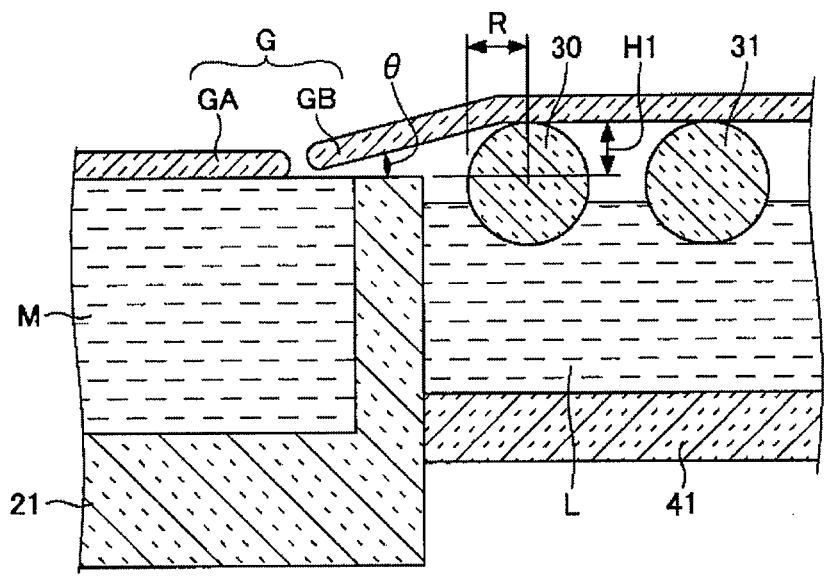
FIGS. 5A and 5B are explanatory drawings (1) of a method for producing a sheet glass according to one embodiment of the invention.

Additionally, the method for producing a sheet glass comprises a step of placing a leading edge portion of the glass ribbon G onto the rotary roll 30. The step is conducted, for example, as shown in FIG. 5A, at the time when the glass ribbon G is broken into two portions GA and GB or at a similar time. The portion GA at an upstream side is lifted with a pole or the like and is placed onto the rotary roll 30.

Since the rotary roll 30 of the present embodiment is supported from below, it is hardly bent by gravity as compared with the case where a rotary shaft extending from the edge portion of the rotary roll 30 is supported by a bearing as before. Accordingly, the radius R of the rotary roll 30 can be decreased and the rotary roll 30 can be brought near to the bath 21. Therefore, in the case where the drawing-up angle θ of the glass ribbon G is constant, a difference in height H1 (see FIG. 5A) between the drawing-up position of the glass ribbon G from the molten metal M and the supporting position of the glass ribbon G with the rotary roll 30 decreases. Accordingly, it is easy to place the upstream portion GA on the rotary roll 30.

Figure 5B:
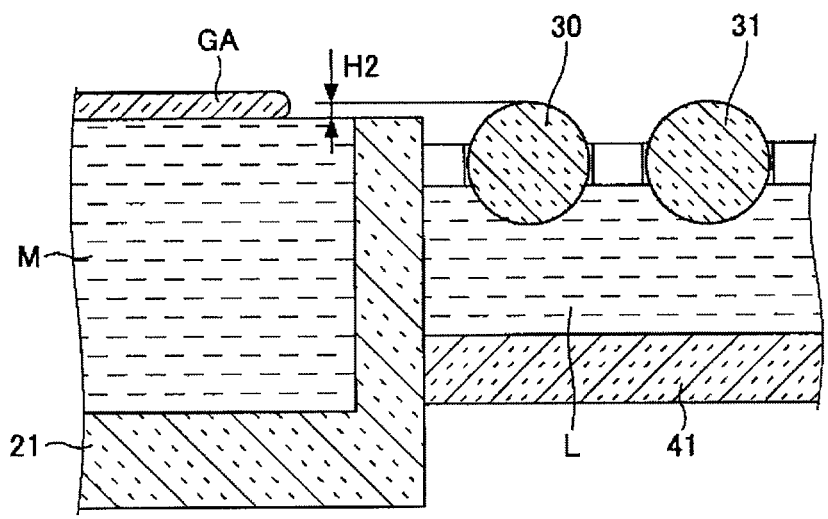

Moreover, the method for producing a sheet glass may have a step of reducing the amount of the liquid L in the auxiliary bath 41 to lower the rotary roll 30 against the bath 21 as shown in FIG. 5B before the portion GA at the upstream side is placed onto the rotary roll 30. Since a difference in height H2 between the drawing-up position and the supporting position decreases (H2<H1), the above operation is more facilitated. Furthermore, even when the above operation is not conducted, it is possible to ride on the rotary roll 30 by pushing the portion GA at the upstream side with the assist roll 26 (see FIG. 1).

The lowering of the rotary roll 30 against the bath 21 is performed by elevating the moving unit 46 (see FIG. 3) to a predetermined position against the liquid storage unit 45 (see FIG. 3). The amount of the liquid in the liquid storage unit 45 is increased, the amount of the liquid in the auxiliary bath 41 is decreased, and the liquid level of the auxiliary bath 41 is lowered, so that the rotary roll 30 is lowered to a predetermined position.

Figure 6A:
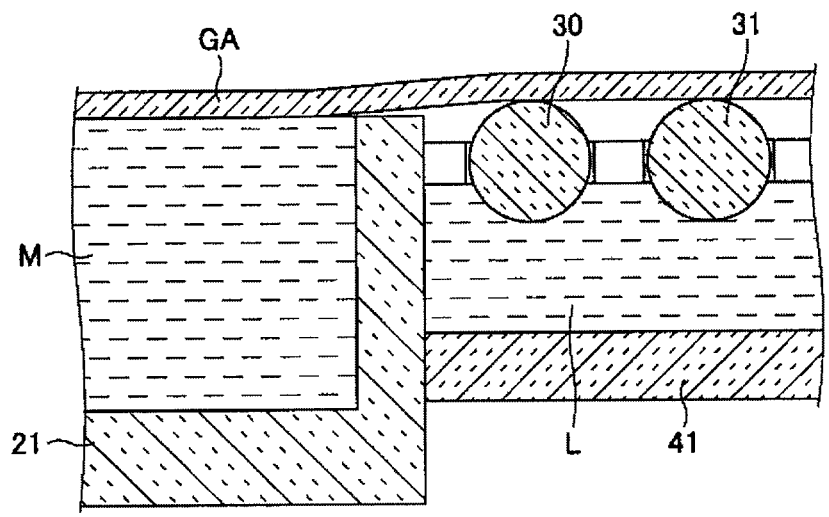
FIGS. 6A and 6B are explanatory drawings (2) of a method for producing a sheet glass according to one embodiment of the invention.
Figure 6B:
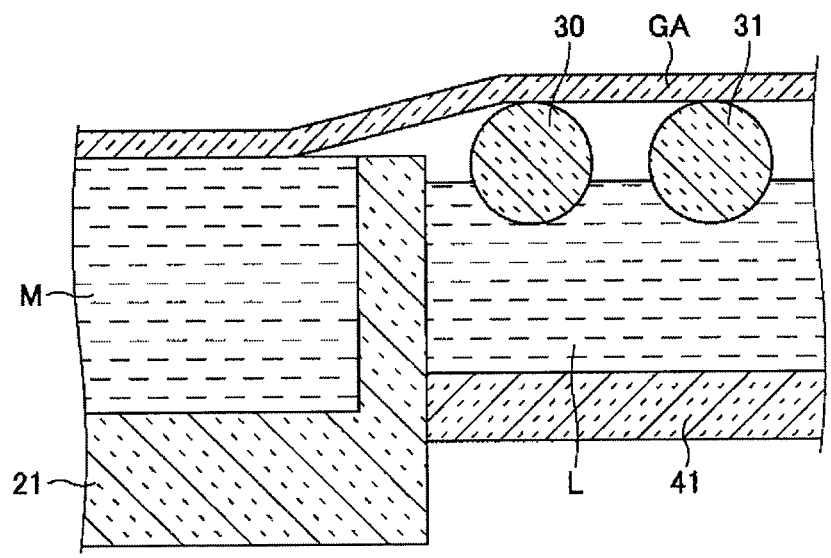

In addition, the method for producing a sheet glass may have a step of increasing the amount of the liquid L in the auxiliary bath 41 to lift up the rotary roll 30 against the bath 21 as shown in FIG. 6B after the portion GA at the upstream side is placed onto the rotary roll 30 as shown in FIG. 6A. The glass ribbon 12 can be prevented from rubbing against the side wall (especially side wall at the downstream side) of the bath 21.

The elevation of the rotary roll 30 against the bath 21 is achieved by lowering the moving unit 46 (see FIG. 3) to an original position against the liquid storage unit 45 (see FIG. 3). The amount of the liquid in the liquid storage unit 45 is decreased, the amount of the liquid in the auxiliary bath 41 is increased, and the liquid level of the auxiliary bath 41 is raised, so that the rotary roll 30 is elevated to the original position.

Incidentally, in the present embodiment, explanation is conducted at the time when the glass ribbon G is broken but the invention can be also applied to the time when the production of the sheet glass is started or restarted.

(Sheet Glass)

The kind of glass for the sheet glass is selected depending on use application of the sheet glass. For example, in the case of a glass substrate for LCD, an alkali-free glass is used. Moreover, in the case of a glass substrate for PDP or in the case of window glass for vehicles or window glass for buildings, soda lime glass is used. In the case of cover glass for displays, alkali silicate glass capable of chemical reinforcement is mainly used. In the case of a substrate for photo masks, quartz glass having a low thermal expansion coefficient is mainly used.

An alkali-free glass contains, for example, as represented by mass percentage on the basis of oxides, $SiO_2$: 50 to 66%; $Al_2O_3$: 10.5 to 24%; $B_2O_3$: 0 to 12%; MgO: 0 to 8%; CaO: 0 to 14.5%; SrO: 0 to 24%; BaO: 0 to 13.5%; and $ZrO_2$: 0 to 5%, in which MgO+CaO+SrO+BaO is 9 to 29.5%. In the alkali-free glass, the total amount of the contents of alkali metal oxides may be 0.1% or less.

An alkali-free glass preferably contains, as represented by mass percentage on the basis of oxides, $SiO_2$: 58 to 66%; $Al_2O_3$: 15 to 22%; $B_2O_3$: 5 to 12%; MgO: 0 to 8%; CaO: 0 to 9%; SrO: 3 to 12.5%; and BaO: 0 to 2%, in which MgO+CaO+SrO+BaO is 9 to 18%.

Chemical composition of the sheet glass is measured by a commercially available X-ray fluorescence spectrometer (e.g., ZSX100e manufactured by Rigaku Corporation).

FIRST MODIFICATION EXAMPLE

The example is different in that the liquid amount controlling unit 44 is composed of the liquid storage unit 45, the moving unit 46, the driving unit 47, and the like in the above embodiment but a liquid amount controlling unit is composed of a pump conveying the liquid L between the auxiliary bath 41 and the outside in the present modification example. Hereinafter, explanation will be focused on the different point.

Figure 7:
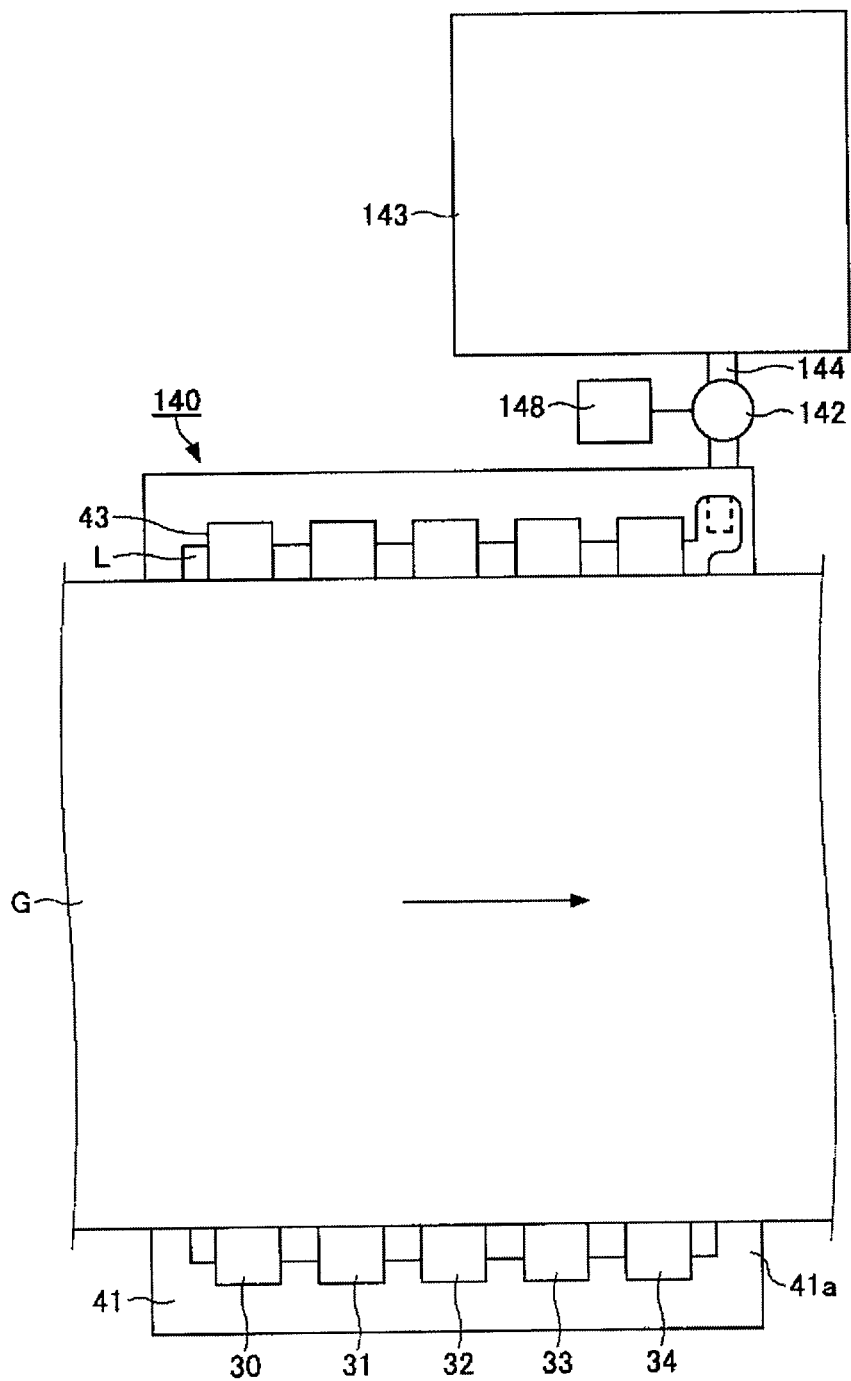
FIG. 7 is a plan view showing a supporting device according to a first modification example and is a drawing corresponding to FIG. 2.

FIG. 7 is a plan view showing a supporting device according to the first modification example and is a drawing corresponding to FIG. 2. The supporting device 140 is used instead of the supporting device 40 shown in FIG. 2 and the like, and supports the rotary roll 30 from below and can lift up and down the rotary roll 30.

The supporting device 140 includes an auxiliary bath 41 storing the liquid L that floats the rotary roll 30 and a ceiling 42 (see FIG. 1) that covers above the auxiliary bath 41. In order to prevent the oxidation of the molten metal that is the liquid L, the atmosphere above the liquid L is preferably a reducing atmosphere.

The supporting device 140 has a pump 142 as a liquid amount controlling unit that controls the amount of the liquid L in the auxiliary bath 41. The pump 142 conveys the liquid L between the auxiliary bath 41 and the outside. The pump 142 is provided on the way of a connection pipe 144 that connects a storage unit 143 storing the liquid L and the auxiliary bath 41. As the pump 142, a bubble pump or the like is used. The conveyance of the liquid L by the pump 142 may be regulated by a controller 148 containing CPU, memories, and the like.

When the liquid L in the storage unit 143 is conveyed to the auxiliary bath 41 by the pump 142, the liquid amount in the auxiliary bath 41 is increased, so that the liquid level of the auxiliary bath 41 is raised and the rotary roll 30 is elevated. On the other hand, when the liquid L in the auxiliary bath 41 is returned to the storage unit 143 by the pump 142, the liquid amount in the auxiliary bath 41 is decreased, so that the liquid level of the auxiliary bath 41 is brought down and the rotary roll 30 is lowered.

As above, the supporting device 140 of the present modification example supports the rotary roll 30 from below and can lift up and down the rotary roll 30 similarly to the supporting device 40 of the above embodiment, so that the same effect as in the above embodiment is obtained.

Incidentally, the bath 21 may be used as the storage unit 143. The volume of the bath 21 is remarkably larger than the volume of the auxiliary bath 41. Therefore, the liquid level of the bath 21 is hardly varied at the time of controlling the liquid level of the auxiliary bath 41, so that the formability of the glass ribbon G is hardly changed.

SECOND MODIFICATION EXAMPLE

The example is different in that the rotary roll 30 is supported by floating it on the liquid L in the auxiliary bath 41 in the above embodiment and the first modification example but the rotary roll 30 is supported by a support roll 241 in the present modification example. Hereinafter, explanation will be conducted focusing on the different point.

Figure 8:
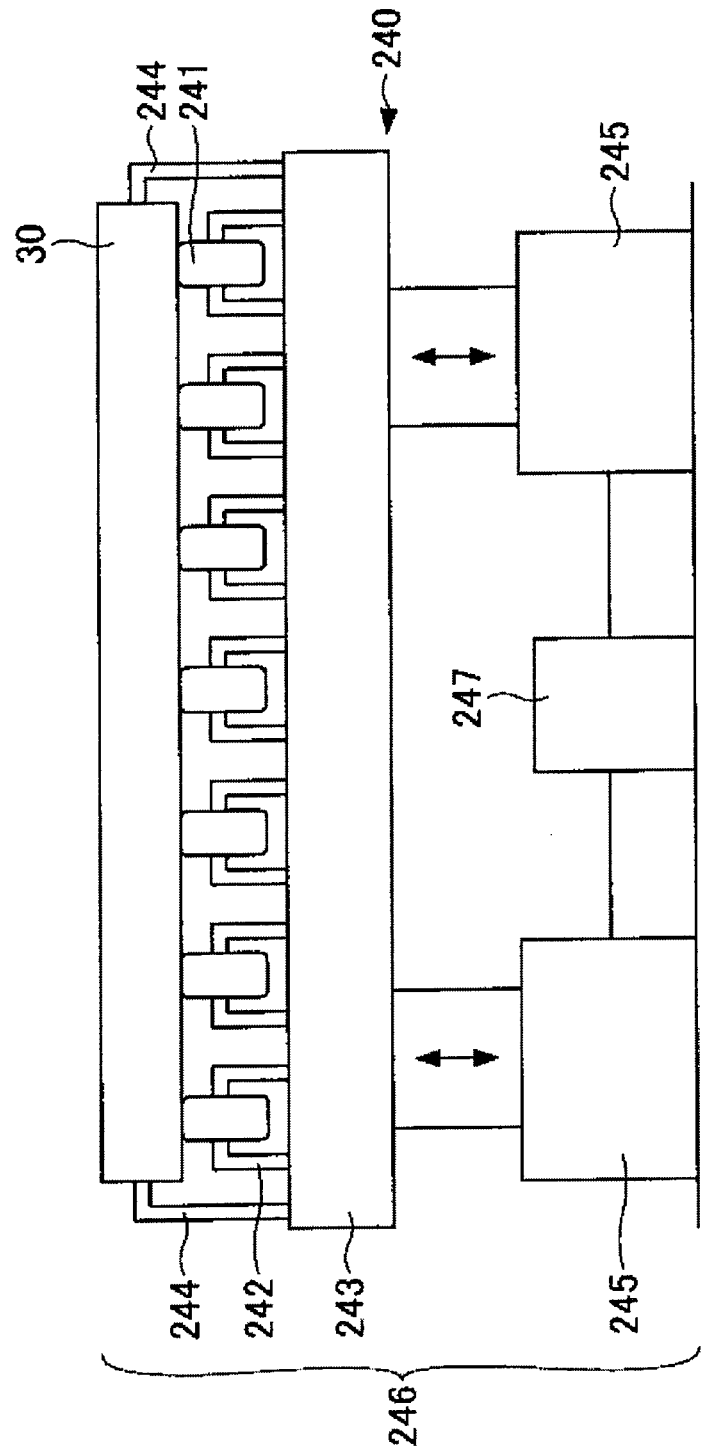
FIG. 8 is a front view showing a supporting device according to a second modification example and is a drawing corresponding to FIG. 3.

FIG. 8 is a front view showing a supporting device according to the second modification example and is a drawing corresponding to FIG. 3. The supporting device 240 shown in FIG. 8 is used instead of the supporting device 40 shown in FIG. 3 and the like, and supports the rotary roll 30 from below and can lift up and down the rotary roll 30.

The supporting device 240 has the support roll 241 that supports the rotary roll 30 from below. The support roll 241 is formed into, for example, a column shape or a cylindrical shape. Since the support roll 241 is used at high temperature, it is formed from, for example, a ceramic such as silicon carbide or silica or carbon.

The support roll 241 comes into contact with an outer circumferential surface of the rotary roll 30 and rotates with the rotation of the rotary roll 30. The support roll 241 is rotatable around the central axis of the support roll 241. The support roll 241 may be shorter than the rotary roll 30 is and plural support rolls may be arranged at intervals in a direction parallel to the center line of the rotary roll 30.

The support roll 241 is rotatably supported with a supporting member 242 for support roll and the supporting member 242 for support roll is fixed to a lift table 243. The supporting member 242 for support roll supports the support roll 241 rotatably. Plural supporting members 242 for support roll are provided corresponding to plural support rolls 241.

The rotary roll 30 supported with the plural support rolls 241 from below is rotatable around the central axis of the rotary roll 30. The rotary roll 30 is supported with supporting members 244 for rotary roll and the supporting members 244 for rotary roll are fixed to the lift table 243.

The lift table 243 can move up and down against the bath 21 and is moved by a driving unit 245.

As the driving unit 245, there is used a hydrostatic pressure cylinder such as a hydraulic cylinder or a pneumatic cylinder, a linear motor, a combination of a rotary motor and a ball-screw mechanism that converts the rotation force of the rotary motor into a linear movement, or the like. A roll lifting unit 246 is composed of the supporting member 242 for support roll, the lift table 243, the supporting member 244 for rotary roll, the driving unit 245, and the like.

The roll lifting unit 246 lifts up and down the support roll 241 and the rotary roll 30 against the bath 21. The lifting of the support roll 241 and the rotary roll 30 may be controlled by a controller 247 containing CPU, memories, and the like.

The roll lifting unit 246 lowers the support roll 241 and the rotary roll 30 with respect to the bath 21 before the portion GA at the upstream side (see FIGS. 5A and 5B) is placed onto the rotary roll 30. Specifically, the lift table 243 is lowered to a predetermined position with respect to the bath 21 to lower the support roll 241 and the rotary roll 30 to a predetermined position.

Additionally, the roll lifting unit 246 elevates the support roll 241 and the rotary roll 30 with respect to the bath 21 after the portion GA at the upstream side is placed onto the rotary roll 30. Specifically, the lift table 243 is elevated to an original position with respect to the bath 21 to lift up the support roll 241 and the rotary roll 30 to an original position.

As above, the supporting device 240 of the present modification example supports the rotary roll 30 from below and can lift up and down the rotary roll 30 similarly to the supporting device 40 of the above embodiment, so that the same effect as in the above embodiment is obtained.

While the present invention has been described in detail with reference to specific embodiments thereof, it will be apparent to one skilled in the art that various changes and modifications can be made therein without departing from the spirit and scope thereof.

This application is based on Japanese Patent Application No. 2012-024751 filed on Feb. 8, 2012, the contents of which are incorporated herein by reference.

DESCRIPTION OF REFERENCE NUMERALS AND SIGNS

10: Apparatus for producing sheet glass
20: Forming device
21: bath
30: Rotary roll
40 Supporting device
41 Auxiliary bath
41a: Side wall at downstream side of auxiliary bath
43: Guide groove
44: Liquid amount controlling unit
142: Pump
241: Support roll
246: Roll lifting unit
G: Glass ribbon
L: Liquid
M: Molten metal

The invention claimed is:

1. A method for producing a sheet glass, the method comprising:
a step of forming a glass ribbon by allowing molten glass continuously supplied onto molten metal in a bath to flow on the molten metal;
a step of drawing the glass ribbon obliquely upward from the molten metal by using a rotary roll disposed in an outer vicinity of the bath; and
a step of placing a leading edge portion of the glass ribbon onto the rotary roll,
wherein the rotary roll is supported from below,
wherein the rotary roll is floated on a liquid in an auxiliary bath provided adjacent to the bath and is supported with the liquid and
wherein the rotary roll is vertically movable in accordance with a change of a liquid level due to an increase or a decrease of an amount of the liquid in the auxiliary bath.

2. The method for producing a sheet glass according to claim 1, further comprising a step of reducing an amount of the liquid in the auxiliary bath to lower the rotary roll with respect to the bath before a leading edge portion of the glass ribbon is placed onto the rotary roll.

3. The method for producing a sheet glass according to claim 1, further comprising a step of increasing the amount of the liquid in the auxiliary bath to elevate the rotary roll with respect to the bath after the leading edge portion of the glass ribbon is placed onto the rotary roll.

4. The method for producing a sheet glass according to claim 1, wherein the liquid is molten metal.

5. The method for producing a sheet glass according to claim 4, wherein an atmosphere above the molten metal in the auxiliary bath is a reducing atmosphere.

6. The method for producing a sheet glass according to claim 1, wherein the rotary roll is formed from carbon, silicon carbide, or silica.

7. The method for producing a sheet glass according to claim 1, wherein the sheet glass is composed of an alkali-free glass containing, as represented by mass percentage on the basis of oxides, $SiO_2$: 50 to 66%; $Al_2O_3$: 10.5 to 24%; $B_2O_3$:

0 to 12%; MgO: 0 to 8%; CaO: 0 to 14.5%; SrO: 0 to 24%; BaO: 0 to 13.5%; and $ZrO_2$: 0 to 5%, wherein MgO+CaO+SrO+BaO is 9 to 29.5%.

8. The method for producing a sheet glass according to claim 7, wherein the sheet glass is composed of an alkali-free glass containing, as represented by % by mass based on oxides, $SiO_2$: 58 to 66%; $Al_2O_3$: 15 to 22%; $B_2O_3$: 5 to 12%; MgO: 0 to 8%; CaO: 0 to 9%; SrO: 3 to 12.5%; and BaO: 0 to 2%, wherein MgO+CaO+SrO+BaO is 9 to 18%.

* * * * *